US010716063B2

(12) United States Patent
Frederiksen et al.

(10) Patent No.: US 10,716,063 B2
(45) Date of Patent: *Jul. 14, 2020

(54) SEARCHING FOR CONTROL CHANNELS IN A WIRELESS NETWORK

(71) Applicant: Wireless Future Technologies Inc., Ottawa (CA)

(72) Inventors: Frank Frederiksen, Klarup (DK); Troels Emil Kolding, Klarup (DK)

(73) Assignee: WIRELESS FUTURE TECHNOLOGIES INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,917

(22) Filed: Jan. 22, 2018

(65) Prior Publication Data

US 2018/0160369 A1 Jun. 7, 2018

Related U.S. Application Data

(63) Continuation of application No. 15/050,011, filed on Feb. 22, 2016, now Pat. No. 9,877,277, which is a (Continued)

(30) Foreign Application Priority Data

May 7, 2007 (EP) .................................. 07107652

(51) Int. Cl.
*H04W 52/02* (2009.01)
*H04B 7/26* (2006.01)
(Continued)

(52) U.S. Cl.
CPC ...... *H04W 52/0209* (2013.01); *H04B 7/2637* (2013.01); *H04J 11/00* (2013.01);
(Continued)

(58) Field of Classification Search
CPC ...... H04B 7/2637; H04J 11/00; H04L 5/0051; H04W 52/0209; H04W 72/0406;
(Continued)

(56) References Cited

U.S. PATENT DOCUMENTS 8,189,502 B2   5/2012 Kwak et al.
9,271,266 B2*  2/2016 Frederiksen ......... H04B 7/2637
(Continued)

FOREIGN PATENT DOCUMENTS

CN   101611652 A   12/2009
CN   101689927 A   3/2010
(Continued)

OTHER PUBLICATIONS

Ericsson et al., "Downlink Control Signaling," 3GPP TSG RAN WG1 #48 Meeting, R1-071216, St. Louis, USA (Feb. 12-16, 2007).
(Continued)

*Primary Examiner* — Steven H Nguyen
(74) *Attorney, Agent, or Firm* — Volpe and Koenig, P.C.

(57) ABSTRACT

A user equipment (UE) may receive an OFDM signal having control channel elements (CCEs). The CCEs may be arranged in levels where a first level aggregates less CCEs than a second level. A processor may search for a control channel from control channel candidates that is comprised of the CCEs. A limited number of CCEs may be searched on the first level.

25 Claims, 5 Drawing Sheets

Related U.S. Application Data continuation of application No. 12/451,350, filed as application No. PCT/EP2008/055557 on May 6, 2008, now Pat. No. 9,271,266.

(51) Int. Cl.
*H04W 72/04* (2009.01)
*H04J 11/00* (2006.01)
*H04L 5/00* (2006.01)
*H04W 88/02* (2009.01)

(52) U.S. Cl.
CPC ......... *H04L 5/0051* (2013.01); *H04W 72/042* (2013.01); *H04W 72/0406* (2013.01); *H04W 88/02* (2013.01); *Y02B 70/30* (2013.01); *Y02D 70/00* (2018.01); *Y02D 70/1262* (2018.01); *Y02D 70/142* (2018.01); *Y02D 70/449* (2018.01)

(58) Field of Classification Search
CPC .... H04W 72/042; H04W 88/02; Y02B 70/30; Y02B 60/50; Y02D 70/00; Y02D 70/1262; Y02D 70/142; Y02D 70/449
See application file for complete search history.

(56) References Cited

U.S. PATENT DOCUMENTS

| | | | |
|---|---|---|---|
| 9,877,277 B2 * | 1/2018 | Frederiksen | H04B 7/2637 |
| 2004/0190482 A1 | 9/2004 | Baum et al. | |
| 2006/0120322 A1 | 6/2006 | Lindskog et al. | |
| 2006/0233124 A1 | 10/2006 | Palanki | |
| 2008/0159323 A1 * | 7/2008 | Rinne | H04L 1/0004 |
| | | | 370/431 |
| 2008/0163002 A1 | 7/2008 | Frederiksen | |
| 2008/0188247 A1 | 8/2008 | Worrall | |
| 2009/0325585 A1 | 12/2009 | Farajidana et al. | |
| 2010/0067445 A1 * | 3/2010 | Rinne | H04L 5/0007 |
| | | | 370/329 |

FOREIGN PATENT DOCUMENTS

| | | |
|---|---|---|
| CN | 101809929 A | 8/2010 |
| EP | 0 575 281 | 11/1999 |
| EP | 1 313 228 | 5/2003 |
| EP | 1988667 A2 | 11/2008 |
| KR | 2003-0041468 | 5/2003 |
| KR | 2006-0039865 | 5/2006 |
| RU | 2216107 | 11/2003 |
| RU | 2280951 | 7/2006 |
| WO | 06/022876 | 3/2006 |
| WO | 07/051186 | 5/2007 |
| WO | 2008/081004 A2 | 7/2008 |
| WO | 2008/084422 A1 | 7/2008 |
| WO | 2008/136616 A1 | 11/2008 |

OTHER PUBLICATIONS

LG Electronics, "PDCCH design principles," 3GPP TSG RAN WG1 #48bis, R1-071548, Malta (Mar. 26-30, 2007).
Motorola, "E-UTRA Downlink Control Channel Structure and TP," 3GPP TSG RAN1#44, R1-060378, pp. 1-7 (Feb. 2006).
Motorola, "EUTRA SC-FDMA Uplink Resource Block, Resource Allocation and Pilot/Reference Signal Design & TP," 3GPP TSG RAN1 LTE Ad Hoc, R1-060246, pp. 1-18 (Jan. 2006).
Nokia, "Structure and transport of the Downlink Control Channel," 3GPP TSG RAN WG1 #47bis Meeting, R1-070398, Sorrento, Italy (Jan. 15-19, 2007).
Nokia, "Structure and transport of the Downlink Control Channels," 3GPP TSG RAN WG1 #48 Meeting, R1-071003, St. Louis, USA (Feb. 12-16, 2007).
Samsung, "Physical Channel Structure and Procedure for EUTRA Downlink," 3GPP TSG-RAN WG1 Meeting #42, Tdoc R1-050884, pp. 1-18 (Sep. 2005).
Samsung, "Restriction on PDCCH monitoring set," 3GPP TSG RAN WG1 #49, R1-072220, Kobe, Japan (May 7-11, 2007).
Third Generation Partnership Project, "Technical Specification Group Radio Access Network; Physical layer procedures (Release 8)," 3GPP TS 36.213 V1.0.0 (Mar. 2007).
Third Generation Partnership Project, "Technical Specification Group Radio Access Network; Physical Channels and Modulation (Release 8)," 3GPP TS 36.211 V1.0.0 (Mar. 2007).
Third Generation Partnership Project, "Technical Specification Group Radio Access Network; Multiplexing and channel coding (Release 8)," 3GPP TS 36.212 V1.0.0 (Mar. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.0.0 (Mar. 2007).
Zyren, "Overview of the 3GPP Long Term Evolution Physical Layer," White paper from freescale semiconductor, pp. 1-25 (Jul. 2007).
Nokia et al., "Reducing the decoding complexity of the PDCCH," 3GPP TSG-RAN Working Group 1 #50bis, R1-074317, Shanghai, China (Oct. 8-12, 2007).
Qualcomm Europe, "Signaling Choices for UL ACK/NAK," 3GPP TSG-RAN WG1 #48-bis, R1-071296, (Mar. 26-30, 2007).

* cited by examiner

SEARCHING FOR CONTROL CHANNELS IN A WIRELESS NETWORK

CROSS REFERENCE TO RELATED APPLICATIONS

This application is a continuation of U.S. patent application Ser. No. 15/050,011, filed Feb. 22, 2016, which is a continuation of U.S. patent application Ser. No. 12/451,350, filed Mar. 2, 2010, which issued as U.S. Pat. No. 9,271,266 on Feb. 23, 2016, which is the U.S. national stage of International Application No. PCT/EP2008/055557, filed May 6, 2008, which claims the benefits of European Application No. 07107652.5, filed May 7, 2007, which are incorporated by reference as if fully set forth.

FIELD OF THE INVENTION

The present invention relates to control channels in communication network systems, and in particular to control channel allocation and decoding e.g. in 3GPP ($3^{rd}$ Generation Partnership Project) LTE (Long Term Evolution) network systems.

BACKGROUND OF THE INVENTION

LTE technology, for example, defines a packet radio system, where all channel allocations are expected to happen in short periods of sub-frames. This is contrary to the older 3G systems, where dedicated signalling channels are necessary to be set up even for packet traffic. It is also different from WLAN (Wireless Local Area Network) type of allocations, where each IP (Internet Protocol) packet transmission contains a transport header.

According to LTE technology, all allocations are signalled in Shared Control Channels, which are present in first multi-carrier symbols of a sub-frame preceding multi-carrier symbols of data channels. The control channels are separately coded. That is, a downlink (or uplink) channel is divided into two separate parts, one for control and one for data. The data part (PDSCH) carries downlink (or uplink) data for simultaneously scheduled users, while the control part (PDCCH) carries (among others) allocation information for the scheduled users.

SUMMARY OF THE INVENTION

The present invention provides methods and devices for reducing control channel decoding complexity as defined in the appended claims. The invention may also be implemented as computer program product.

According to the invention, a tree search for aggregated control channels is reduced in a systematic way, which will obtain a significant reduction of the number of decoding attempts at a UE (User Equipment) side, while still maintaining most of the scheduling flexibility in an eNB (evolved Node B), i.e. system spectral efficiency versus UE complexity trade-off is obtained.

According to the invention it is assumed that there will not be a large amount of users having the same propagation conditions being scheduled at the same time. The tree reduction is obtained by putting some limitations on the tree structure through specifications.

The UE utilizes the tree structure to reduce the decoding complexity in order to save power. According to an embodiment of the invention, power consumption in the decoding/detection of an L1/L2 control channel can be reduced.

For the purpose of the present invention to be described herein below, it should be noted that

- a user equipment may for example be any device by means of which a user may access a communication network; this implies mobile as well as non-mobile devices and networks, independent of the technology platform on which they are based;
- a user equipment can act as a client entity or as a server entity in terms of the present invention, or may even have both functionalities integrated therein;
- method steps likely to be implemented as software code portions and being run using a processor at one of the server/client entities are software code independent and can be specified using any known or future developed programming language;
- method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices can be implemented as individual devices, but this does not exclude that they are implemented in a distributed fashion throughout the system, as long as the functionality of the device is preserved.

The present invention is not limited to LTE network systems, but can be applied to any other communication systems requiring dynamic and fast channel allocation, including systems where there will be multiple code rates for the control channel.

DESCRIPTION OF THE PREFERRED EMBODIMENTS

Figure 1:
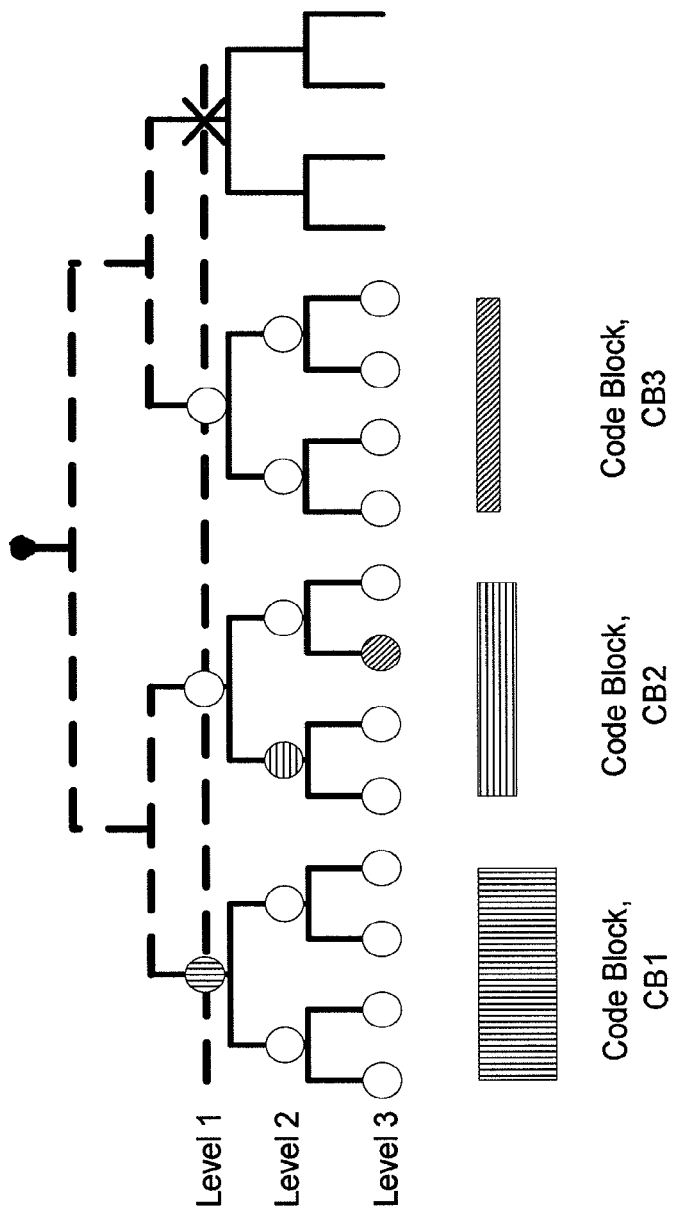
FIG. 1 shows an example of a tree structure with three allocated nodes in different levels of the tree.

A Physical Downlink Shared Control Channel (PDSCCH) which carries (among others) allocation information for simultaneously scheduled users of a communication network system is arranged to a tree structure consisting of multiple control channel elements as shown in FIG. 1. During decoding, a UE (User Equipment) will combine or aggregate the control channel elements to create different code blocks or control channel candidates. Each code block is called a control channel candidate as it potentially carries information for one MAC (Medium Access Control) ID. The MAC ID is used by the UE or by a group of UEs to detect the channel. At each level of the tree, each node represents a single control channel of a code block. The number of the control channels at the lowest level of the tree is determined by the system bandwidth and number of OFDM symbols n available for the largest code blocks, as well as the size of the control channel elements. In the example shown in FIG. 1, n=3. Any node of the tree, which is not occupied by a control channel in this level, is available for the next level of the tree as two control channels, each of which are half of the size of the control channel at the parent node.

The system bandwidth consisting of a given number of sub-carrier resources may be divided to an integer multiple of the largest control channels. A given node of the tree i.e. a set of sub-carriers can consist of one control channel of the largest code block, of up to two control channels of the second largest code blocks or up to four control channels of the smallest code blocks.

Figure 2:
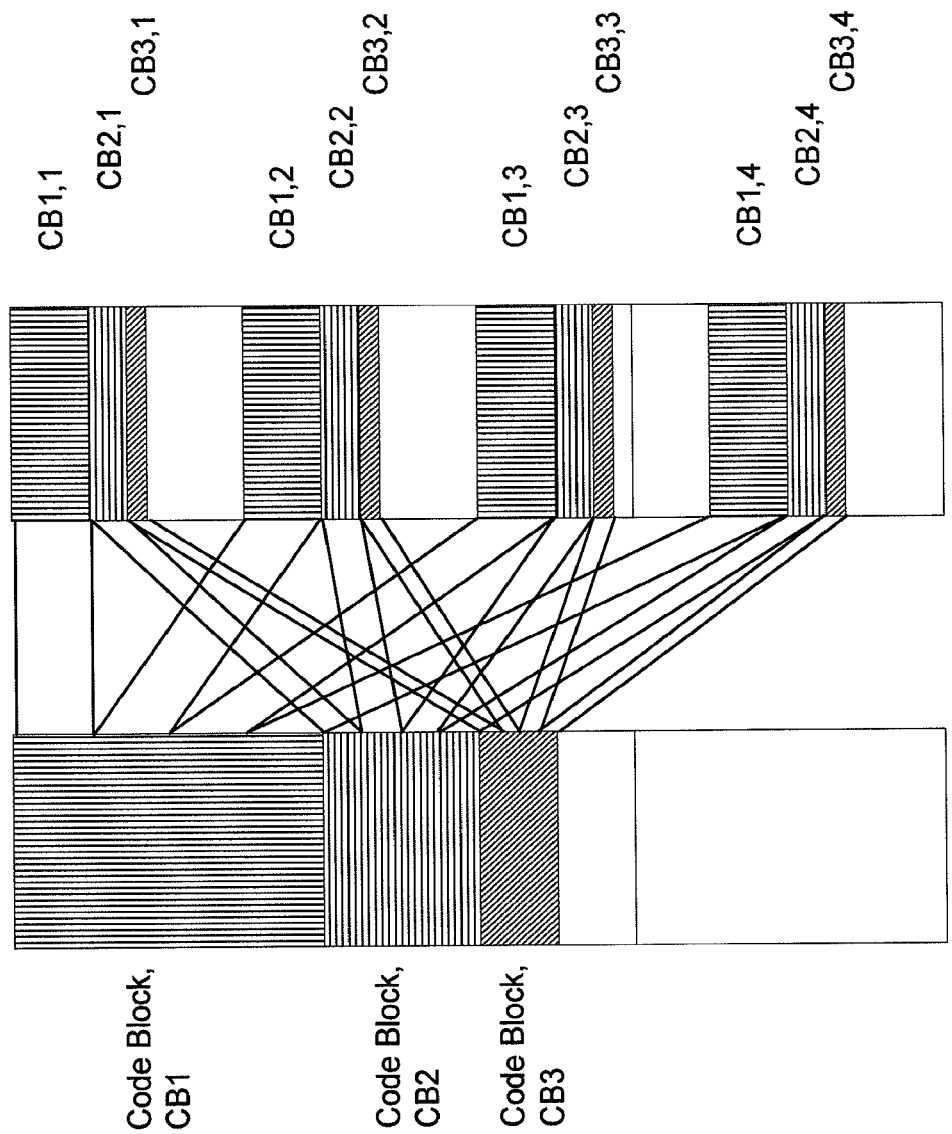
FIG. 2 shows the three allocated nodes of FIG. 1 mapped to sub-carrier resources in a distributed manner.

Each control channel extends entirely over the first n OFDM symbols, which are available for the control channels. The control channels may be distributed to the sub-carriers over the system bandwidth to maximize the frequency diversity. For example, there are 4 distributed sets of sub-carrier resources allocated per each code-block. This is illustrated in FIG. 2.

In FIG. 1, three allocated nodes CB1, CB2, CB3 in different levels of the tree structure are shown. FIG. 2 shows the three allocated nodes CB1, CB2, CB3 mapped to the sub-carrier resources in a distributed manner. It should be noted that these mappings are only examples, and that the mapping in general should provide frequency diversity by scattering over the system bandwidth.

As each control channel has to be uniquely identified by a MAC ID, it can be combined to CRC (Cyclic Redundancy Code) by partly masking CRC bits with the MAC-ID. As the MAC ID is used for addressing both UE specific control channels and common control channels, it is reasonable to define the MAC ID in a compatible way. Thus, reception of any control channel is possible by filtering control channels with the respective MAC ID. Error detection is available from the MAC ID masked CRC. The length of the MAC ID is matched to the C-RNTI (Cell Radio Network Temporary Identifier) length.

A receiver, e.g. the UE, includes means to receive symbols of the Downlink Shared Control Channel part of the sub-frame prior to reception and processing of the symbols in the downlink and uplink Shared Data Channels. The receiver demodulates and decodes the sub-carriers of the OFDM symbols in which the receiver may search for a set of largest code blocks, e.g. CB1 of FIG. 1. As the Code Block is of known size and the system bandwidth is known, the receiver knows an integer multiple of sub-carrier positions to search for a CB1. The reception, whether correctly detected or not, may be recognized by Cyclic Redundancy Check detector filtered by a receiver specific c-RNTI identity. For every match of CRC, to which the c-RNTI of the UE does not match, the receiver knows that the next higher level of tree is masked and not available. For every non-matched CRC check, the UE will continue decoding code blocks (CB2) in the next higher level of the tree searching for a match in two child nodes of the parent node. Further on, for every non-matched CRC check, the UE will continue decoding code blocks (CB3) in the next higher level of the tree searching for a match in two child nodes of the parent node. The search continues until the UE has detected and correctly decoded all control channels, intended for its reception.

In addition to search signalling entries with its own receiver specific c-RNTI, the UE may have to search for common signalling entries by common identifiers.

The search in the tree may happen in any other order than from the lowest level node towards the higher level nodes. Depending on the applied coding scheme, the receiver may process the nodes from the highest level of nodes to the lower level of nodes. Further on, the receiver may process the nodes in other arbitrary (or systematic) order based on some measures e.g. SINR (Signal Interference and Noise Ratio) quality of the candidate code block(s).

In the following it is assumed that only a single size of a node (i.e. control channel) at the highest level of the tree structure (level 3 in FIG. 1) is defined for a given bandwidth in a cell. The highest level node is referred to as "control channel element". Aggregation of multiple control channel elements can be used to get larger payloads and/or lower coding rate.

However, the aggregation of the control channel elements may require a large number of decoding attempts from all the UEs that are listening for a possible allocation. An example of a control channel aggregation is shown in FIG. 3.

Figure 3:
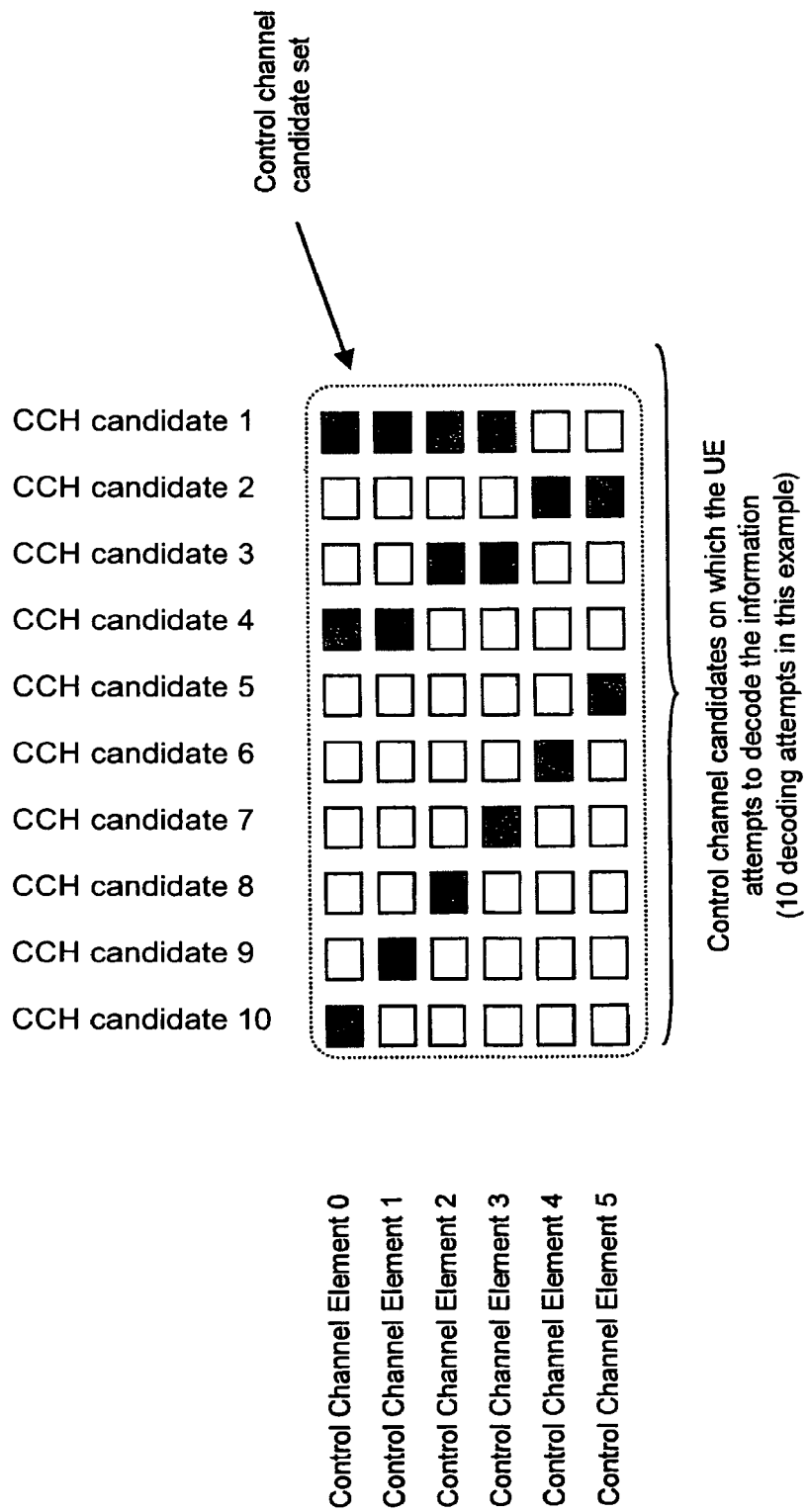
FIG. 3 shows a combination of control channel elements to create aggregated control channel candidates.

From FIG. 3 it can be seen that an aggregation of even a relative low number of control channel elements will result in a rather high number of decoding attempts for the UEs listening for resource allocations, and each UE will listen for downlink allocations as well as uplink allocations. In the example in FIG. 3, there are 6 control channel elements, while the aggregation using a tree structure as shown in FIG. 1 results in 10 potential control channel candidates. This is suboptimal regarding UE complexity, as a UE will have to decode the full amount of control channel candidates even if some of them are not scheduled.

In the following an embodiment of the invention will described in greater detail.

Figure 4:
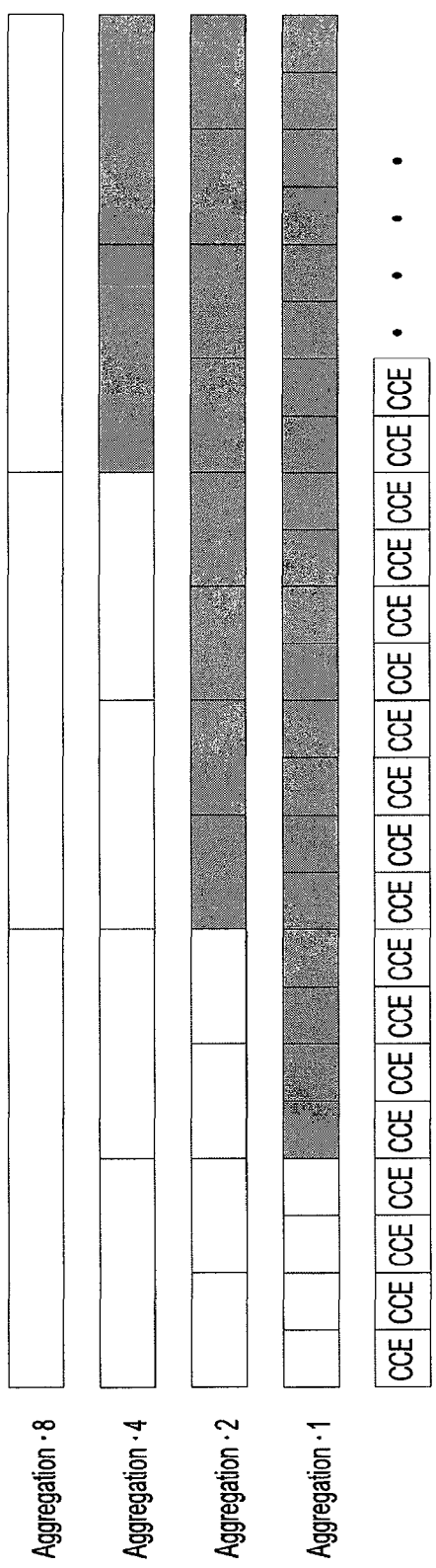
FIG. 4 shows an example illustrating reduction of possible aggregation options for control channel candidates according to an embodiment of the invention.

FIG. 4 shows a kind of flat tree structure arising from FIG. 3. FIG. 4 illustrates potential control channel candidates for different aggregation possibilities (both the white and grey areas). As can be seen from FIG. 4, there is a total of 24 control channel elements (CCEs), which by default triggers 45 decoding attempts per link direction (i.e. downlink/uplink) allocation. In other words, in aggregation level 1 the 24 control channel elements each may form a control channel. In aggregation level 2, two control channel elements may be aggregated to form a control channel, in aggregation level 4, four control channel elements may be aggregated to form a control channel, and in aggregation level 8, eight control channel elements may be aggregated to form a control channel.

According to an embodiment of the invention, the control channel structure shown by the white and grey areas in FIG. 4 is put under limitations, such that only the white aggregated control channel candidates are available for scheduling. With this limitation, the number of decoding attempts is reduced to 15 (the grey areas are not decoded in search for a control channel candidate), which corresponds to a reduction by a factor of 3. In other words, there are four control channel candidates in aggregation level 1, four control channel candidates in aggregation level 2, four control channel candidates in aggregation level 4, and three control channel candidates in aggregation level 8.

With the above limitation put on the tree structure, scheduling flexibility is not reduced that much, based on the following arguments:

If there is a lot of user equipments close to an eNB scheduling the control channels, which user equipments require only aggregation level 1, the aggregated level 2 elements with reduced power can be used to have more users due to the possibility of doing power balancing; in the example shown in FIG. 4, 9 favourable conditioned users can be scheduled using this approach. In other words, four control channels in aggregation level 1, two control channels in aggregation level 2, two control channels in aggregation level 4, and one control channel in aggregation level 8 can be scheduled.

If a plurality of scheduled users is present at a cell edge (aggregation level 8), additional users cannot be scheduled anyway due to limited number of available control channel elements.

As the difference between aggregation layers is a factor of 2 and when using power balancing, to some extent there is flexibility to trade aggregation and power between each other.

It should be noted that although the above description is given for an allocation tree for single link direction, the invention is also valid for the case where two trees, for uplink and downlink, respectively, are present.

Further, it should be noted that the number of possible control channels at each layer is not important.

According to an embodiment of the invention, using an allocation rule, usage of the smallest control channel on all control channel elements is prohibited, while at the same time the smaller control channels are allowed to be combined to aggregated control channels with better coverage.

With the above approach, the number of decoding attempts that is needed by each UE can be reduced. The limitation of the tree is possible due to the frequency diversity applied for all control channel elements, such that each CCE experiences same or similar channel conditions.

Figure 5:
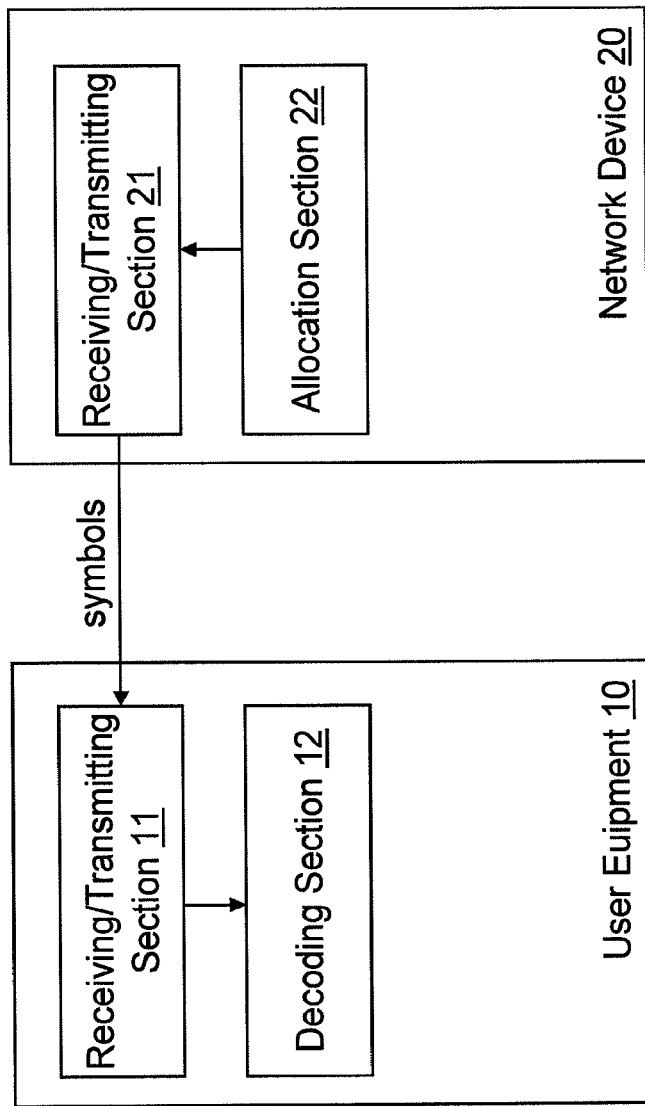
FIG. 5 shows a schematic block diagram illustrating functions of a user equipment and a network device according to an embodiment of the invention.

FIG. 5 shows a schematic block diagram illustrating a user equipment 10 and a network device 20, such as an eNB, according to an embodiment of the invention.

The user equipment 10 comprises a receiving/transmitting section 11 and a decoding section 12. The receiving/transmitting section 11 receives symbols from the network device 20, which comprises a receiving transmitting section 21 transmitting the symbols and an allocation section 22.

The allocation section 22 allocates control channels represented by nodes of a tree structure, each of the control channels comprising at least one control channel element carrying information for a respective identifier used to detect a control channel of the control channels, wherein the allocation is performed by limiting allocation of highest level control channels of the control channels, the highest level control channels being represented by nodes of the tree structure at a highest level of the tree structure. For example, in FIG. 1 the highest level is shown by level 3. Referring to FIG. 4, the highest level is represented by aggregation level 1.

The allocation section 22 may increase allocation of lower level control channels of the control channels, the lower level control channels being represented by nodes of the tree structure at lower levels of the tree structure. For example, in FIG. 1 the lower levels are shown by levels 2 and 1. Referring to FIG. 4, the lower levels are represented by aggregation levels 2, 4 and 8.

The receiving/transmitting section 21 may transmit the allocated control channels as symbols to user equipments including the user equipment 10, by distributing the allocated control channels to sub-carriers over a system bandwidth.

The higher level control channels may be combined to the lower level control channels. In other words, smaller control channels are allowed to be combined to aggregated control channels with better coverage.

The allocation section 22 may increase allocation more the lower the level of the tree structure.

The searching section 12 of the user equipment 10 searches for a control channel by decoding control channels represented by nodes of a tree structure, by using an identifier such as an MAC ID, CRC or c-RNTI, each of the control channels comprising at least one control channel element carrying information for a respective identifier used to detect a control channel of the control channels, wherein the searching section 12 limits the searching for highest level control channels of the control channels, the highest level control channels being represented by nodes of the tree structure at a highest level of the tree structure.

The searching section 12 may increase the searching for lower level control channels of the control channels, the lower level control channels being represented by nodes of the tree structure at lower levels of the tree structure.

The receiving/transmitting section 11 may receive the control channels as symbols from the network device 20.

The searching section 11 may begin the searching with lowest level control channels represented by nodes of the tree structure at a lowest level of the tree structure. For example, in FIG. 1 the lowest level is shown by level 1. Referring to FIG. 4, the lowest level is represented by aggregation level 8.

It is to be noted that the network device 20 and user equipment 10 shown in FIG. 5 may have further functionality for working e.g. as eNodeB and UE. Here the functions of the network device and user equipment relevant for understanding the principles of the invention are described using functional blocks as shown in FIG. 5. The arrangement of the functional blocks of the network device and user equipment is not construed to limit the invention, and the functions may be performed by one block or further split into sub-blocks.

According to an embodiment of the invention, on a transmitting side, control channels represented by nodes of a tree structure are allocated, each of the control channels comprising at least one control channel element carrying information for a respective identifier used to detect a control channel of the control channels. The allocation is performed by limiting allocation of highest level control channels of the control channels, the highest level control channels being represented by nodes of the tree structure at a highest level of the tree structure. On a receiving side, a control channel is searched for by decoding the allocated control channels, wherein the searching is limited for the highest level control channels.

It is to be understood that the above description is illustrative of the invention and is not to be construed as limiting the invention. Various modifications and applications may occur to those skilled in the art without departing from the scope of the invention as defined by the appended claims.

What is claimed is:

1. A method of operating a user equipment (UE), the method comprising:
    receiving control channel information; and
    searching for a control channel in the control channel information by decoding control channels represented by nodes of a tree structure using an identifier, the tree structure having three or more levels, the nodes of the tree structure at a highest level of the tree structure comprising a single control channel element and nodes of the tree structure at lower levels of the tree structure comprising a plurality of consecutive control channel elements, wherein the searching is limited for control channels at the highest level of the tree structure and wherein a percentage of candidate control channels searched increases more the lower the level of the three or more levels of the tree structure.

2. The method of claim 1, wherein searching for a control channel at a lower level of the tree structure is performed prior to searching for a control channel at the highest level of the tree structure.

3. The method of claim 1, wherein searching for a control channel at the highest level of the tree structure is performed prior to searching for a control channel at a lower level of the tree structure.

4. The method of claim 1, wherein the identifier is a cell radio network temporary identifier (C-RNTI) associated with the UE.

5. The method of claim 1, further comprising:
determining a Signal Interference and Noise Ratio (SINR) of received signals; and
based at least in part on the SINR, determining which to perform first of the searching for a control channel at a lower level of the tree structure and the searching for a control channel at the highest level of the tree structure.

6. The method of claim 1, wherein the searching being limited for a highest level control channel and being increased for lower level control channels enables reduced power consumption of the UE.

7. The method of claim 1, wherein the control channel information is received from a network device.

8. The method of claim 1, wherein the searching for control channels at the highest level of the tree structure is limited to a first percentage, wherein a percentage of control channels searched at a first lower level of the tree structure increases to a second percentage, and wherein a percentage of control channels searched at a second lower level of the tree structure that is lower than the first lower level of the tree structure increases to a third percentage.

9. A device comprising:
a receiver operable to receive control channel information; and
circuitry operable to search for a control channel in the control channel information by decoding control channels represented by nodes of a tree structure using an identifier, the tree structure having three or more levels, the nodes of the tree structure at a highest level of the tree structure comprising a single control channel element and nodes of the tree structure at lower levels of the tree structure comprising a plurality of consecutive control channel elements, wherein the search is limited for control channels at the highest level of the tree structure and wherein a percentage of candidate control channels searched increases more the lower the level of the three or more levels of the tree structure.

10. The device of claim 9, wherein searching for a control channel at a lower level of the tree structure is performed prior to searching for a control channel at the highest level of the tree structure.

11. The device of claim 9, wherein searching for a control channel at the highest level of the tree structure is performed prior to searching for a control channel at a lower level of the tree structure.

12. The device of claim 9, wherein the identifier is a cell radio network temporary identifier (C-RNTI) associated with the device.

13. The device of claim 9, further comprising:
circuitry operable to determine a Signal Interference and Noise Ratio (SINR) of received signals; and
circuitry operable to determine, based at least in part on the SINR, which to perform first of the searching for a control channel at a lower level of the tree structure and the searching for a control channel at the highest level of the tree structure.

14. The device of claim 9, wherein the searching being limited for a highest level control channel and being increased for lower level control channels enables reduced power consumption of the device.

15. The device of claim 9, wherein the control channel information is received from a network device.

16. The device of claim 9, wherein the device is a user equipment (UE).

17. The device of claim 9, wherein the searching for control channels at the highest level of the tree structure is limited to a first percentage, wherein a percentage of control channels searched at a first lower level of the tree structure increases to a second percentage, and wherein a percentage of control channels searched at a second lower level of the tree structure that is lower than the first lower level of the tree structure increases to a third percentage.

18. A non-transitory computer readable medium comprising a set of instructions that, when executed by a processor of a user equipment (UE), causes the UE to:
receive control channel information; and
to search for a control channel in the control channel information by decoding control channels represented by nodes of a tree structure using an identifier, the tree structure having three or more levels, the nodes of the tree structure at a highest level of the tree structure comprising a single control channel element and nodes of the tree structure at lower levels of the tree structure comprising a plurality of consecutive control channel elements, wherein the search is limited for control channels at the highest level of the tree structure and wherein a percentage of candidate control channels searched increases more the lower the level of the three or more levels of the tree structure.

19. The non-transitory computer readable medium of claim 18, wherein searching for a control channel at a lower level of the tree structure is performed prior to searching for a control channel at the highest level of the tree structure.

20. The non-transitory computer readable medium of claim 18, wherein searching for a control channel at the highest level of the tree structure is performed prior to searching for a control channel at a lower level of the tree structure.

21. The non-transitory computer readable medium of claim 18, wherein the identifier is a cell radio network temporary identifier (C-RNTI) associated with the UE.

22. The non-transitory computer readable medium of claim 18, wherein the set of instructions, when executed by a processor of a user equipment (UE), causes the UE to:
determine a Signal Interference and Noise Ratio (SINR) of received signals; and
determine, based at least in part on the SINR, which to perform first of the searching for a control channel at a lower level of the tree structure and the searching for a control channel at the highest level of the tree structure.

23. The non-transitory computer readable medium of claim 18, wherein the searching being limited for a highest level control channel and being increased for lower level control channels enables reduced power consumption of the UE.

24. The non-transitory computer readable medium of claim 18, wherein the control channel information is received from a network device.

25. The non-transitory computer readable medium of claim 18, wherein the searching for control channels at the highest level of the tree structure is limited to a first percentage, wherein a percentage of control channels searched at a first lower level of the tree structure increases to a second percentage, and wherein a percentage of control channels searched at a second lower level of the tree structure that is lower than the first lower level of the tree structure increases to a third percentage.

* * * * *